United States Patent
Sakurai

(10) Patent No.: US 11,244,482 B2
(45) Date of Patent: Feb. 8, 2022

(54) IMAGE DRAWING DEVICE, IMAGE DRAWING METHOD, AND IMAGE DRAWING PROGRAM

(71) Applicant: Mitsubishi Electric Corporation, Tokyo (JP)

(72) Inventor: Satoshi Sakurai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 281 days.

(21) Appl. No.: 16/348,052

(22) PCT Filed: Jan. 27, 2017

(86) PCT No.: PCT/JP2017/002862
§ 371 (c)(1),
(2) Date: May 7, 2019

(87) PCT Pub. No.: WO2018/138855
PCT Pub. Date: Aug. 2, 2018

(65) Prior Publication Data
US 2021/0279927 A1  Sep. 9, 2021

(51) Int. Cl.
*G06T 11/00* (2006.01)
*G06T 11/40* (2006.01)
(Continued)

(52) U.S. Cl.
CPC ............ *G06T 11/40* (2013.01); *G06T 11/001* (2013.01); *G06T 15/005* (2013.01)

(58) Field of Classification Search
CPC combination set(s) only.
See application file for complete search history.

(56) References Cited

U.S. PATENT DOCUMENTS

2013/0141448 A1    6/2013  Yokota et al.
2014/0118363 A1*   5/2014  Hakura .............. G06T 15/005
                                                345/505
(Continued)

FOREIGN PATENT DOCUMENTS

JP         9-190539 A       7/1997
JP      2013-120438 A       6/2013

OTHER PUBLICATIONS

German Office Action, dated May 6, 2020, for German Application No. 112017006527.5, with an English translation.

*Primary Examiner* — Wesner Sajous
(74) *Attorney, Agent, or Firm* — Birch, Stewart, Kolasch & Birch, LLP

(57) ABSTRACT

An image drawing device includes a first processor that generates second drawing data and second drawing command groups from first drawing data and first drawing command groups and a second processor. The first processor includes a drawing command reorder unit that generates third drawing command groups by changing an arrangement order of the first drawing command groups and deleting first drawing commands that have become unnecessary to execute due to the changing of the arrangement order of the first drawing command groups, a drawing command combination unit that generates the second drawing command groups by combining pieces of first drawing data corresponding to third drawing commands that can be executed by the second processor in the same drawing condition and deleting unnecessary third drawing commands, and a drawing command execution unit that executes each of the second drawing commands in an arrangement order of the second drawing commands.

9 Claims, 11 Drawing Sheets

(51) Int. Cl.
*G06T 15/00* (2011.01)
*G06T 1/20* (2006.01)
*G06T 1/60* (2006.01)
*G06F 9/38* (2018.01)

(56) References Cited

U.S. PATENT DOCUMENTS

2014/0192072 A1\* 7/2014 Negishi ................... G06T 11/20
345/522
2016/0055608 A1\* 2/2016 Frascati ................... G06T 1/20
345/522

\* cited by examiner

FIG. 4
FIRST DRAWING DATA V0 (T0), V1, V2 (T1), V3 AND V4 SUPPLIED BY APPLICATION EXECUTION UNIT 11
POLYGON P0 (TEXTURE T0)
APEX SEQUENCE V0
| V00 | V01 | V02 | V03 |
|---|---|---|---|
| T00 | T01 | T02 | T03 |
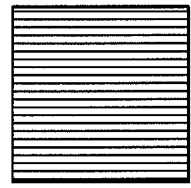
TEXTURE T0
POLYGON P1 (COLOR C0)
APEX SEQUENCE V1
| V10 | V11 | V12 | V13 |
|---|---|---|---|
POLYGON P2 (TEXTURE T1)
APEX SEQUENCE V2
| V20 | V21 | V22 | V23 | V24 |
|---|---|---|---|---|
| T20 | T21 | T22 | T23 | T24 |
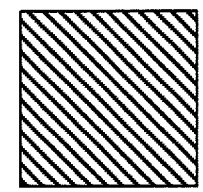
TEXTURE T1
POLYGON P3 (COLOR C1)
APEX SEQUENCE V3
| V30 | V31 | V32 |
|---|---|---|
POLYGON P4 (COLOR C0)
APEX SEQUENCE V4
| V40 | V41 | V42 | V43 |
|---|---|---|---|

FIG. 5

FIRST DRAWING COMMAND GROUPS F0 – F4 SUPPLIED BY APPLICATION EXECUTION UNIT 11

| | |
|---|---|
| FIRST DRAWING COMMAND GROUP F0 FOR DRAWING POLYGON P0 | TEXTURE ACTIVATION |
| | TEXTURE T0 SETTING |
| | APEX SEQUENCE V0 SETTING |
| | DRAWING START |
| FIRST DRAWING COMMAND GROUP F1 FOR DRAWING POLYGON P1 | TEXTURE INACTIVATION |
| | COLOR C0 SETTING |
| | APEX SEQUENCE V1 SETTING |
| | DRAWING START |
| FIRST DRAWING COMMAND GROUP F2 FOR DRAWING POLYGON P2 | TEXTURE ACTIVATION |
| | TEXTURE T1 SETTING |
| | APEX SEQUENCE V2 SETTING |
| | DRAWING START |
| FIRST DRAWING COMMAND GROUP F3 FOR DRAWING POLYGON P3 | TEXTURE INACTIVATION |
| | COLOR C1 SETTING |
| | APEX SEQUENCE V3 SETTING |
| | DRAWING START |
| FIRST DRAWING COMMAND GROUP F4 FOR DRAWING POLYGON P4 | TEXTURE INACTIVATION |
| | COLOR C0 SETTING |
| | APEX SEQUENCE V4 SETTING |
| | DRAWING START |

20 FIRST DRAWING COMMANDS

PROCESS BY DRAWING COMMAND REORDER UNIT 12

FIG. 7

FIRST DRAWING COMMAND GROUPS F0, F2, F1, F4 AND F3 REORDERED BY DRAWING COMMAND REORDER UNIT 12

| | |
|---|---|
| FIRST DRAWING COMMAND GROUP F0 FOR DRAWING POLYGON P0 | TEXTURE ACTIVATION |
| | TEXTURE T0 SETTING |
| | APEX SEQUENCE V0 SETTING |
| | DRAWING START |
| FIRST DRAWING COMMAND GROUP F2 FOR DRAWING POLYGON P2 | TEXTURE ACTIVATION |
| | TEXTURE T1 SETTING |
| | APEX SEQUENCE V2 SETTING |
| | DRAWING START |
| FIRST DRAWING COMMAND GROUP F1 FOR DRAWING POLYGON P1 | TEXTURE INACTIVATION |
| | COLOR C0 SETTING |
| | APEX SEQUENCE V1 SETTING |
| | DRAWING START |
| FIRST DRAWING COMMAND GROUP F4 FOR DRAWING POLYGON P4 | TEXTURE INACTIVATION |
| | COLOR C0 SETTING |
| | APEX SEQUENCE V4 SETTING |
| | DRAWING START |
| FIRST DRAWING COMMAND GROUP F3 FOR DRAWING POLYGON P3 | TEXTURE INACTIVATION |
| | COLOR C1 SETTING |
| | APEX SEQUENCE V3 SETTING |
| | DRAWING START |

 : UNNECESSARY FIRST DRAWING COMMAND

FIG. 8

THIRD DRAWING COMMAND GROUPS G0 – G4 SUPPLIED BY DRAWING COMMAND REORDER UNIT 12

| | |
|---|---|
| FIRST DRAWING COMMAND GROUP F0 (THIRD DRAWING COMMAND GROUP G0) FOR DRAWING POLYGON P0 | TEXTURE ACTIVATION |
| | TEXTURE T0 SETTING |
| | APEX SEQUENCE V0 SETTING |
| | DRAWING START |
| FIRST DRAWING COMMAND GROUP F2 (THIRD DRAWING COMMAND GROUP G1) FOR DRAWING POLYGON P2 | TEXTURE T1 SETTING |
| | APEX SEQUENCE V2 SETTING |
| | DRAWING START |
| FIRST DRAWING COMMAND GROUP F1 (THIRD DRAWING COMMAND GROUP G2) FOR DRAWING POLYGON P1 | TEXTURE INACTIVATION |
| | COLOR C0 SETTING |
| | APEX SEQUENCE V1 SETTING |
| | DRAWING START |
| FIRST DRAWING COMMAND GROUP F4 (THIRD DRAWING COMMAND GROUP G3) FOR DRAWING POLYGON P4 | APEX SEQUENCE V4 SETTING |
| | DRAWING START |
| FIRST DRAWING COMMAND GROUP F3 (THIRD DRAWING COMMAND GROUP G4) FOR DRAWING POLYGON P3 | COLOR C1 SETTING |
| | APEX SEQUENCE V3 SETTING |
| | DRAWING START |

16 THIRD DRAWING COMMANDS

PROCESS BY DRAWING COMMAND COMBINATION UNIT 13

THIRD DRAWING COMMAND GROUPS G0 – G4 SUPPLIED BY DRAWING COMMAND REORDER UNIT 12

⬌ : COMBINATION OF THIRD DRAWING COMMANDS
(COMBINATION OF THIRD DRAWING DATA, DELETION OF HATCHED UNNECESSARY THIRD DRAWING COMMANDS, DELETION OF THIRD DRAWING COMMAND GROUPS INCLUDING DRAWING START COMMAND ALONE)

FIG. 11

SECOND DRAWING COMMAND GROUPS G01, G23 AND G4 SUPPLIED
BY DRAWING COMMAND COMBINATION UNIT 13

| | |
|---|---|
| SECOND DRAWING COMMAND GROUP G01 FOR DRAWING POLYGON P0' (TEXTURE T0') | TEXTURE ACTIVATION |
| | TEXTURE T0' SETTING |
| | APEX SEQUENCE V0' SETTING |
| | DRAWING START |
| SECOND DRAWING COMMAND GROUP G23 FOR DRAWING POLYGON P1 (COLOR C0) | TEXTURE INACTIVATION |
| | COLOR C0 SETTING |
| | APEX SEQUENCE V1' SETTING |
| | DRAWING START |
| SECOND DRAWING COMMAND GROUP G4 FOR DRAWING POLYGON P3 (COLOR C1) | COLOR C1 SETTING |
| | APEX SEQUENCE V3 SETTING |
| | DRAWING START |

11 SECOND DRAWING COMMANDS

ORDER OF EXECUTION OF DRAWING COMMANDS
BY DRAWING COMMAND EXECUTION UNIT 14

FIG. 12

SECOND DRAWING DATA V0' (T0'), V1' AND V3 SUPPLIED BY DRAWING COMMAND COMBINATION UNIT 13

POLYGONS P0, P2 (TEXTURE T0')

| APEX SEQUENCE V0' | | | | | | | | |
|---|---|---|---|---|---|---|---|---|
| V00 | V01 | V02 | V03 | V20 | V21 | V22 | V23 | V24 |
| T00 | T01 | T02 | T03 | T20' | T21' | T22' | T23' | T24' |

POLYGONS P1, P4

| APEX SEQUENCE V1' | | | | |
|---|---|---|---|---|
| V10 | V11 | V12 | V13 | V40 | V41 | V42 | V43 |

POLYGON P3

| APEX SEQUENCE V3 | |
|---|---|
| V30 | V31 | V32 |

TEXTURE T0'

IMAGE DRAWING DEVICE, IMAGE DRAWING METHOD, AND IMAGE DRAWING PROGRAM

TECHNICAL FIELD

The present invention relates to an image drawing device and an image drawing method in which a first processor outputs drawing data and a drawing command group to a second processor and thereby makes the second processor execute a process according to drawing commands included in the drawing command group, and to an image drawing program executed by the first processor of the image drawing device.

BACKGROUND ART

In computer graphics, polygons are used a lot as primitives of drawing content. In general, a CPU (Central Processing Unit) as a first processor and a GPU (Graphic Processing Unit) as a second processor are used for drawing of polygons. The GPU executes a plurality of pipeline processes in parallel in order to efficiently process a great amount of data. Thus, when a change in the drawing condition of the GPU, such as switching whether to use texture or not, or a change in the color of a polygon, occurs in the middle of the drawing process by the GPU, a plurality of pipeline processes is interrupted and the processing efficiency of the GPU decreases.

As a countermeasure against this problem, Patent Reference 1 proposes a method of shortening the drawing time by removing unnecessary drawing commands in a drawing process using a computer.

PRIOR ART REFERENCE

Patent Reference

Patent Reference 1: Japanese Patent Application Publication No. 09-190539

SUMMARY OF THE INVENTION

Problem to be Solved by the Invention

However, even though the method described in the Patent Reference 1 is capable of shortening the drawing time as a versatile method, the method has not taken characteristics of the hardware (H/W) into consideration and is incapable of resolving the aforementioned problem of decrease in the processing efficiency due to the interruption of pipeline processes that is a bottleneck of the GPU in recent years.

The object of the present invention, which has been made to resolve the above-described problem, is to provide an image drawing device, an image drawing method and an image drawing program capable of increasing the processing efficiency of the second processor in the drawing process.

Means for Solving the Problem

An image drawing device according to an aspect of the present invention includes: a first processor to generate a plurality of pieces of second drawing data and a plurality of second drawing command groups including a plurality of second drawing commands from a plurality of pieces of first drawing data and a plurality of first drawing command groups including a plurality of first drawing commands; and a second processor to execute a drawing process based on the plurality of pieces of second drawing data and the plurality of second drawing command groups outputted from the first processor. The first processor includes: a drawing command reorder unit to generate a plurality of third drawing command groups by changing an arrangement order indicating an order of executing the plurality of first drawing command groups and deleting first drawing commands that have become unnecessary to execute due to the changing of the arrangement order of the plurality of first drawing command groups among the plurality of first drawing commands; a drawing command combination unit to generate the plurality of pieces of second drawing data by combining pieces of first drawing data corresponding to third drawing commands that can be executed by the second processor in a same drawing condition among a plurality of third drawing commands included in the plurality of third drawing command groups and generate the plurality of second drawing command groups corresponding to the plurality of pieces of second drawing data by deleting the third drawing commands that have become unnecessary due to the combining of the pieces of first drawing data; and a drawing command execution unit to execute each of the plurality of second drawing commands in an arrangement order of the plurality of second drawing commands.

Effect of the Invention

According to the present invention, it is possible to increase the processing efficiency in the drawing process of the second processor executing processes according to the drawing commands included in the drawing command groups outputted from the first processor.

BRIEF DESCRIPTION OF THE DRAWINGS

FIG. 4 is a diagram showing an example of a plurality of pieces of drawing data (first drawing data) supplied by an application execution unit of the image drawing device according to the embodiment.

FIG. 5 is a diagram showing an example of a plurality of drawing command groups (first drawing command groups) supplied by the application execution unit of the image drawing device according to the embodiment.

FIG. 7 is an explanatory drawing showing an example of the operation of the drawing command reorder unit of the image drawing device according to the embodiment (deletion of an unnecessary first drawing command).

FIG. 8 is a diagram showing an example of a plurality of drawing command groups (third drawing command groups) supplied by the drawing command reorder unit of the image drawing device according to the embodiment.

FIG. 11 is a diagram showing an example of a plurality of drawing command groups (second drawing command groups) supplied by the drawing command combination unit of the image drawing device according to the embodiment.

FIG. 12 is a diagram showing an example of a plurality of pieces of drawing data (second drawing data) supplied by the drawing command combination unit of the image drawing device according to the embodiment.

MODE FOR CARRYING OUT THE INVENTION

Figure 1:
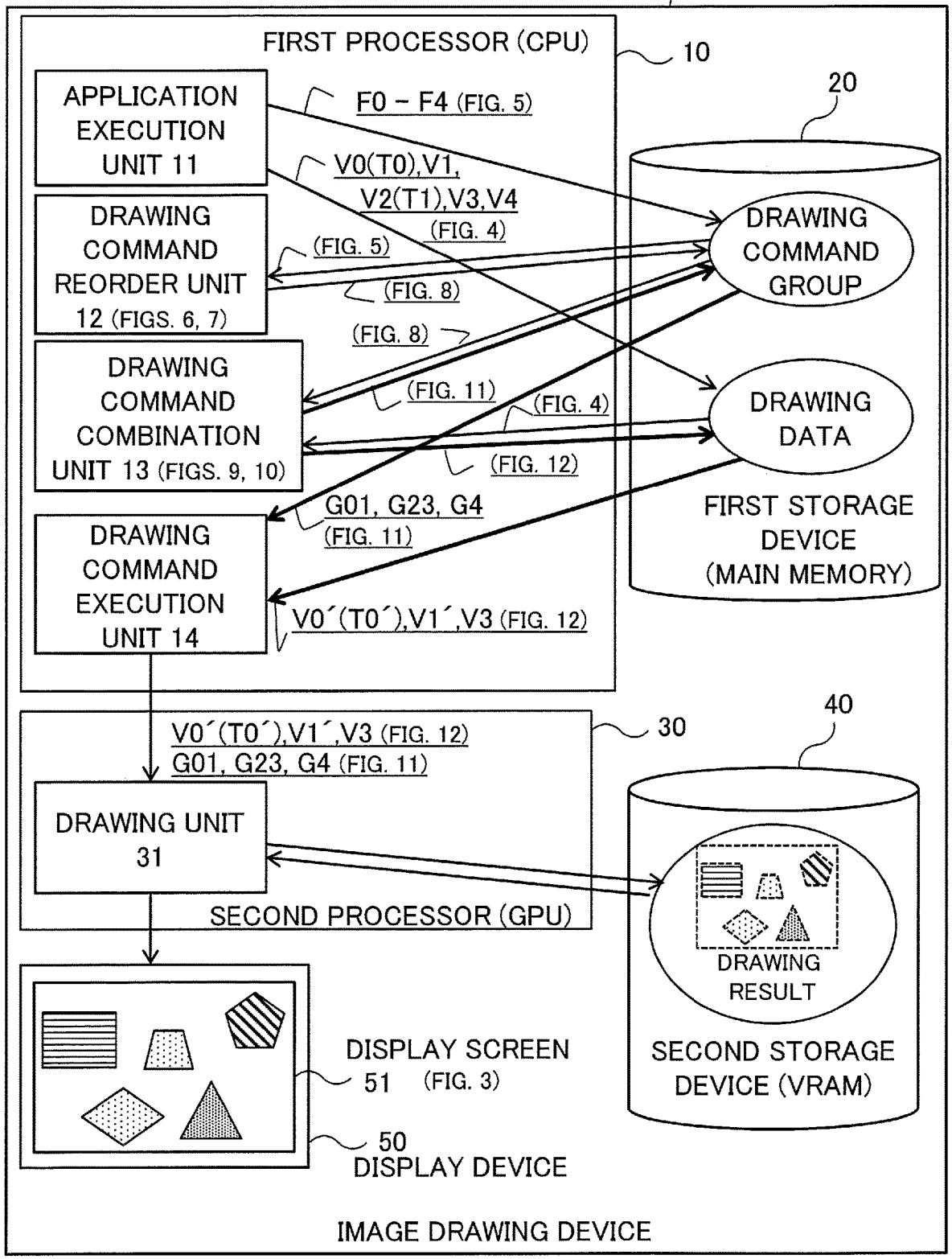
FIG. 1 is a functional block diagram showing a schematic configuration of an image drawing device according to an embodiment of the present invention.
Figure 2:
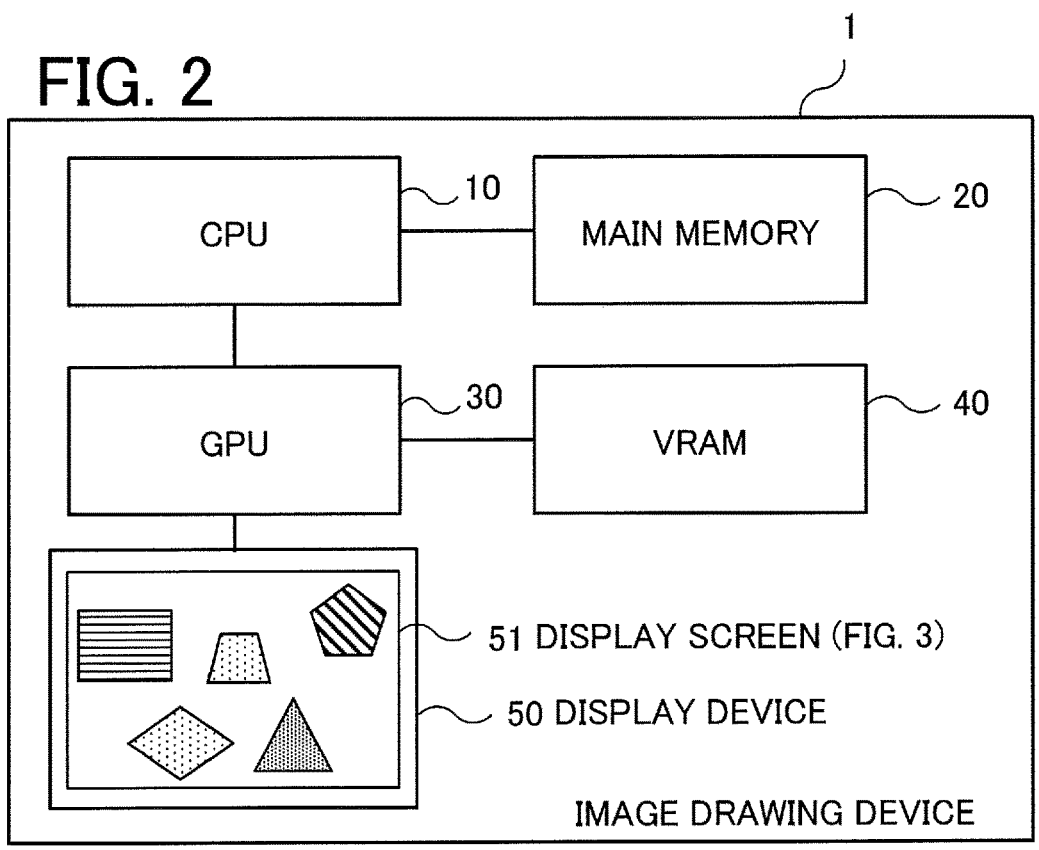
FIG. 2 is a block diagram schematically showing a hardware configuration of the image drawing device according to the embodiment.

An image drawing device, an image drawing method and an image drawing program according to an embodiment of the present invention will be described below with reference to the accompanying drawings. The following embodiment is just an example and a variety of modifications are possible within the scope of the present invention.
(1) General Outline of Image Drawing Device FIG. 1 is a functional block diagram showing a schematic configuration of an image drawing device 1 according to an embodiment of the present invention. FIG. 2 is a block diagram schematically showing a hardware configuration of the image drawing device 1 according to the embodiment. As shown in FIG. 1 and FIG. 2, the image drawing device 1 includes a first processor 10 as a CPU, a first storage device 20 as a main memory, a second processor 30 as a GPU, and a second storage device 40 as a VRAM (Video Random Access Memory). The image drawing device 1 may also include a display device (display) 50 for displaying images, such as a liquid crystal display device.

The image drawing device 1 is a device capable of executing the image drawing method according to the embodiment. The first processor 10 is a means capable of executing the image drawing program according to the embodiment. The image drawing program according to the embodiment has been stored in, for example, an external storage device (not shown) and is loaded into the first storage device 20 and executed.

As shown in FIG. 1, the first processor 10 generates a plurality of pieces of drawing data (second drawing data) V0' (T0'), V1', V3 (shown in FIG. 12 which will be explained later) and a plurality of drawing command groups (second drawing command groups) G01, G23 and G4 (shown in FIG. 11 which will be explained later) including a plurality of drawing commands (second drawing commands) from a plurality of pieces of drawing data (first drawing data) V0 (T0), V1, V2 (T1), V3 and V4 (shown in FIG. 4 which will be explained later) and a plurality of drawing command groups (first drawing command groups) F0 to F4 (shown in FIG. 5 which will be explained later) including a plurality of drawing commands (first drawing commands), and successively executes the plurality of second drawing commands.

As shown in FIG. 1, the second processor 30 includes a drawing unit 31 and executes a drawing process based on the plurality of pieces of second drawing data V0' (T0'), V1' and V3 (shown in FIG. 12) and the plurality of second drawing command groups G01, G23 and G4 (shown in FIG. 11) outputted from the first processor 10. The drawing unit 31 is implemented by execution of a prescribed program by the second processor 30. The second processor 30 is capable of storing the result of the drawing process in the second storage device 40. Further, the second processor 30 supplies the result of the drawing process to the display device 50, and the display device 50 is capable of displaying an image based on the result of the drawing process (shown in FIG. 3 which will be explained later) on a display screen 51.

As shown in FIG. 1, the first processor 10 includes an application execution unit 11, a drawing command reorder unit 12, a drawing command combination unit 13 and a drawing command execution unit 14. The application execution unit 11, the drawing command reorder unit 12, the drawing command combination unit 13 and the drawing command execution unit 14 are implemented by execution of an image processing program by the first processor 10.

The application execution unit 11, having a function of executing any application, generates a plurality of pieces of first drawing data V0 (T0), V1, V2 (T1), V3 and V4 (shown in FIG. 4) and a plurality of first drawing command groups F0 to F4 (shown in FIG. 5) including a plurality of first drawing commands based on input data inputted from the outside, for example, and temporarily stores the first drawing data V0 (T0), V1, V2 (T1), V3 and V4 and the first drawing command groups F0 to F4 in the first storage device 20.

The drawing command reorder unit 12 generates a plurality of drawing command groups (third drawing command groups) (shown in FIG. 8) by deleting first drawing commands (shown in FIG. 6 and FIG. 7) that have become unnecessary to execute due to changing of an arrangement order indicating an order of executing the plurality of first drawing command groups F0 to F4 (shown in FIG. 5) among the plurality of first drawing commands temporarily stored in the first storage device 20, and temporarily stores the plurality of third drawing command groups in the first storage device 20.

The drawing command combination unit 13 generates the plurality of pieces of second drawing data V0' (T0'), V1' and V3 (shown in FIG. 12) by combining pieces of first drawing data corresponding to third drawing commands that can be executed by the second processor 30 in the same drawing condition among a plurality of third drawing commands included in the plurality of third drawing command groups (shown in FIG. 8), generates the plurality of second drawing command groups G01, G23 and G4 (shown in FIG. 11) corresponding to the plurality of pieces of second drawing data V0' (T0'), V1' and V3 by deleting third drawing commands that have become unnecessary due to the combining of the pieces of first drawing data, and temporarily stores the second drawing command groups G01, G23 and G4 and the second drawing data V0' (T0'), V1' and V3 in the first storage device 20.

The drawing command execution unit 14 outputs the second drawing command groups G01, G23 and G4 (shown in FIG. 11) and the second drawing data V0' (T0'), V1' and V3 (shown in FIG. 12) from the first storage device 20 to the second processor 30. For example, the drawing command execution unit 14 executes each of the plurality of second drawing commands in the arrangement order of the plurality of second drawing commands.
(2) Application Execution Unit 11

Figure 3:
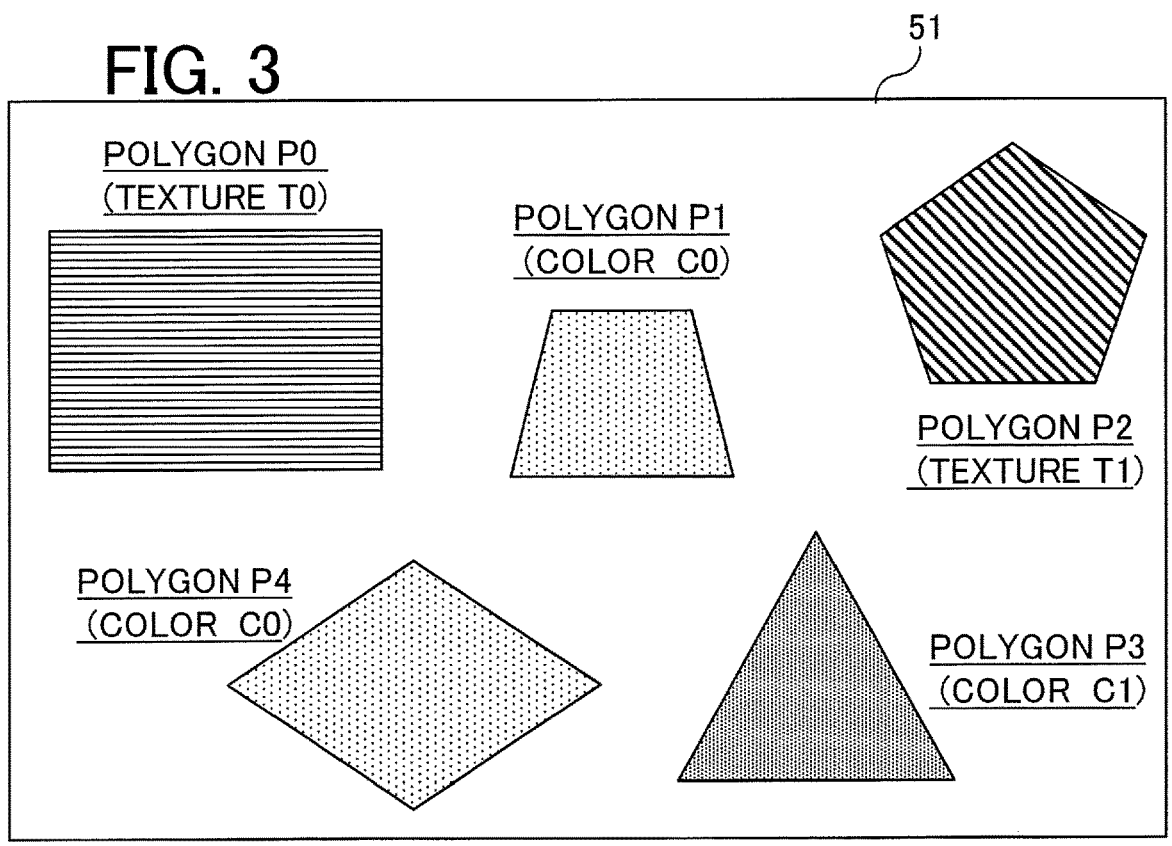
FIG. 3 is a diagram showing an example of polygons included in an image displayed on a display screen of a display device.

FIG. 3 is a diagram showing an example of polygons P0 to P4 included in an image displayed on the display screen 51 of the display device 50. FIG. 4 is a diagram showing an example of the plurality of pieces of first drawing data V0 (T0), V1, V2 (T1), V3 and V4 supplied by the application execution unit 11. FIG. 5 is a diagram showing an example of the plurality of first drawing command groups F0 to F4 supplied by the application execution unit 11.

FIG. 4 shows five pieces of first drawing data V0 (T0), V1, V2 (T1), V3 and V4. FIG. 5 shows 20 first drawing commands included in five first drawing command groups F0 to F4. The application execution unit 11 has a function of executing an application for displaying an image on the display screen 51. The application execution unit 11 outputs the plurality of drawing command groups F0 to F4 (shown in FIG. 5) including a plurality of first drawing commands and the plurality of pieces of drawing data (shown in FIG. 4) to the first storage device 20.

When the drawing content is represented by a polygon, the drawing data includes at least coordinates of each apex of the polygon (apex coordinates). Further, the drawing data can include various types of information such as texture data indicating texture, information indicating the quality of the material of the polygon, and light source information regarding a light source illuminating the polygon. In this embodiment, a case where the drawing data includes apex sequence data including apex coordinates of each polygon and the texture data will be described as an example. In a case where texture is mapped to a polygon, the apex sequence data includes texture coordinates indicating the relationship between the apices of the polygon and the mapping of the texture, in addition to the apex coordinates of the polygon. The drawing command is a command for the second processor 30 generated by the first processor 10 and includes at least a command for changing the drawing condition of the second processor 30 and a drawing start command. Information indicating the drawing condition of the second processor 30 can include (a) information indicating the presence/absence of the mapping of texture, (b) reference information specifying texture to be mapped in a case where texture is mapped, and (c) reference information specifying the color of the polygon and the apex sequence data of the polygon in a case where texture is not mapped.

In the example shown in FIG. 3, texture T0 is mapped to a polygon P0, texture T1 is mapped to a polygon P2, a polygon P1 is filled in with a color C0, a polygon P4 is filled in with the color C0, and a polygon P3 is filled in with a color C1.

In the example shown in FIG. 4, apex sequence data V0 and V2 are indicated as sequences of apex coordinates and texture coordinates, while apex sequence data V1, V3 and V4 are indicated as sequences of apex coordinates.

In the example shown in FIG. 5, F0 to F4 indicate the first drawing command groups for respectively drawing the polygons P0 to P4. Each of the plurality of first drawing command groups F0 to F4 includes a plurality of first drawing commands. In the example shown in FIG. 5, each of the plurality of first drawing command groups F0 to F4 includes one or more drawing condition alteration commands and a drawing start command as the first drawing commands.

(3) Drawing Command Reorder Unit 12

Figure 6:
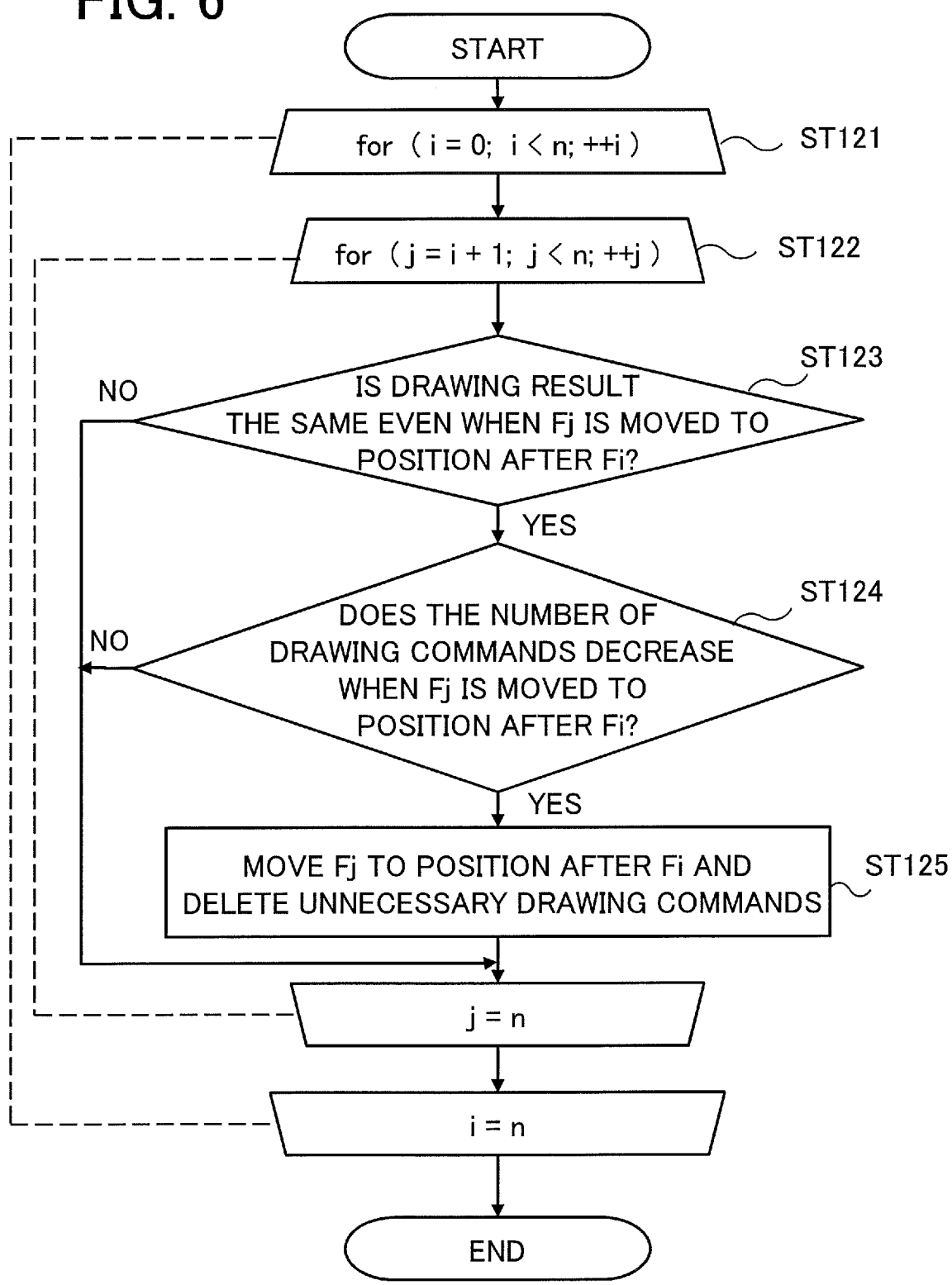
FIG. 6 is a flowchart showing an example of the operation of a drawing command reorder unit of the image drawing device according to the embodiment.

FIG. 6 is a flowchart showing an example of the operation of the drawing command reorder unit 12. FIG. 7 is a diagram showing an example of the operation of the drawing command reorder unit 12 (deletion of unnecessary first drawing commands). FIG. 8 is a diagram showing an example of a plurality of third drawing command groups G0 to G4 supplied by the drawing command reorder unit 12.

The drawing command reorder unit 12 changes the arrangement order of the plurality of first drawing command groups F0 to F4 so as to reduce (or desirably minimize) the number of drawing commands within an extent in which there is no change in the drawing result. In the example shown in FIG. 7, the first drawing command groups F0, F2, F1, F4 and F3 after changing the arrangement order will be respectively referred to as the third drawing command groups G0 to G4, and drawing commands included in the third drawing command groups G0 to G4 will be respectively referred to as third drawing commands. This reordering is carried out according to the following process, for example.

As shown in FIG. 6, the drawing command reorder unit 12 initializes a variable i in step ST121, executes the processing from step ST122 (loop process of the step ST122), and increments the variable i. Then, the drawing command reorder unit 12 repeats the same processing (loop process of the step ST122) as long as i<n, and ends the loop process of the step ST121 when i=n. Incidentally, n is the number of the first drawing command groups.

The drawing command reorder unit 12 initializes a variable j to i+1 in the step ST122, executes the processing from step ST123 (steps ST123 to ST125), and increments the variable j. Then, the drawing command reorder unit 12 repeats the same processing (steps ST123 to ST125) as long as j<n, and ends the loop process of the step ST122 when j=n.

In the step ST123, the drawing command reorder unit 12 refers to a first drawing command group Fi and a first drawing command group Fj corresponding to the variable i and the variable j, moves the first drawing command group Fj to a position immediately after the first drawing command group Fi, and thereby checks whether or not the drawing result (namely, the image displayed on the display screen 51) is the same even when the anteroposterior relationship between overlapped polygons changes. When the drawing result is the same (YES in the step ST123), the drawing command reorder unit 12 advances the process to step ST124. When the drawing result changes (NO in the step ST123), the drawing command reorder unit 12 returns the process to the step ST122.

In the step ST124, the drawing command reorder unit 12 moves the first drawing command group Fj to the position immediately after the first drawing command group Fi and thereby checks whether or not the number of first drawing commands in the first drawing command group Fj (precisely, the number of first drawing commands accompanied by a change in the drawing condition of the second processor 30) can be reduced. When the number of first drawing commands can be reduced (YES in the step ST124), the drawing command reorder unit 12 advances the process to the step ST125.

Incidentally, when a drawing condition to be set by a first drawing command included in the first drawing command group Fj has already been set at a stage after the processing by a first drawing command in the first drawing command group Fi as indicated by hatched regions in FIG. 7, the first drawing command is judged to be an unnecessary drawing command and to be deletable. For example, by moving the first drawing command group F2 to a position immediately after the first drawing command group F0 as shown in FIG. 7, the first drawing command "texture activation" in the first drawing command group F2 becomes deletable. Further, by moving the first drawing command group F4 to a position immediately after the first drawing command group F1 as shown in FIG. 7, for example, the first drawing commands "texture inactivation" and "color C0 setting" in the first drawing command group F4 become deletable. When the number of first drawing commands cannot be reduced (NO in the step ST124), the drawing command reorder unit 12 returns the process to the step ST122.

In the step ST125, the drawing command reorder unit 12 changes the arrangement order of the first drawing command groups by moving the first drawing command group Fj to the position after the first drawing command group Fi, deletes deletable first drawing commands, and thereafter returns the process to the step ST122.

FIG. 8 shows the result of applying the process of the drawing command reorder unit 12 to the first drawing command groups F0 to F4 in FIG. 5. In FIG. 8, the drawing command groups for drawing the polygons P0, P2, P1, P4 and P3 are respectively referred to as the third drawing command groups G0 to G4.

(4) Drawing Command Combination Unit 13

Figure 9:
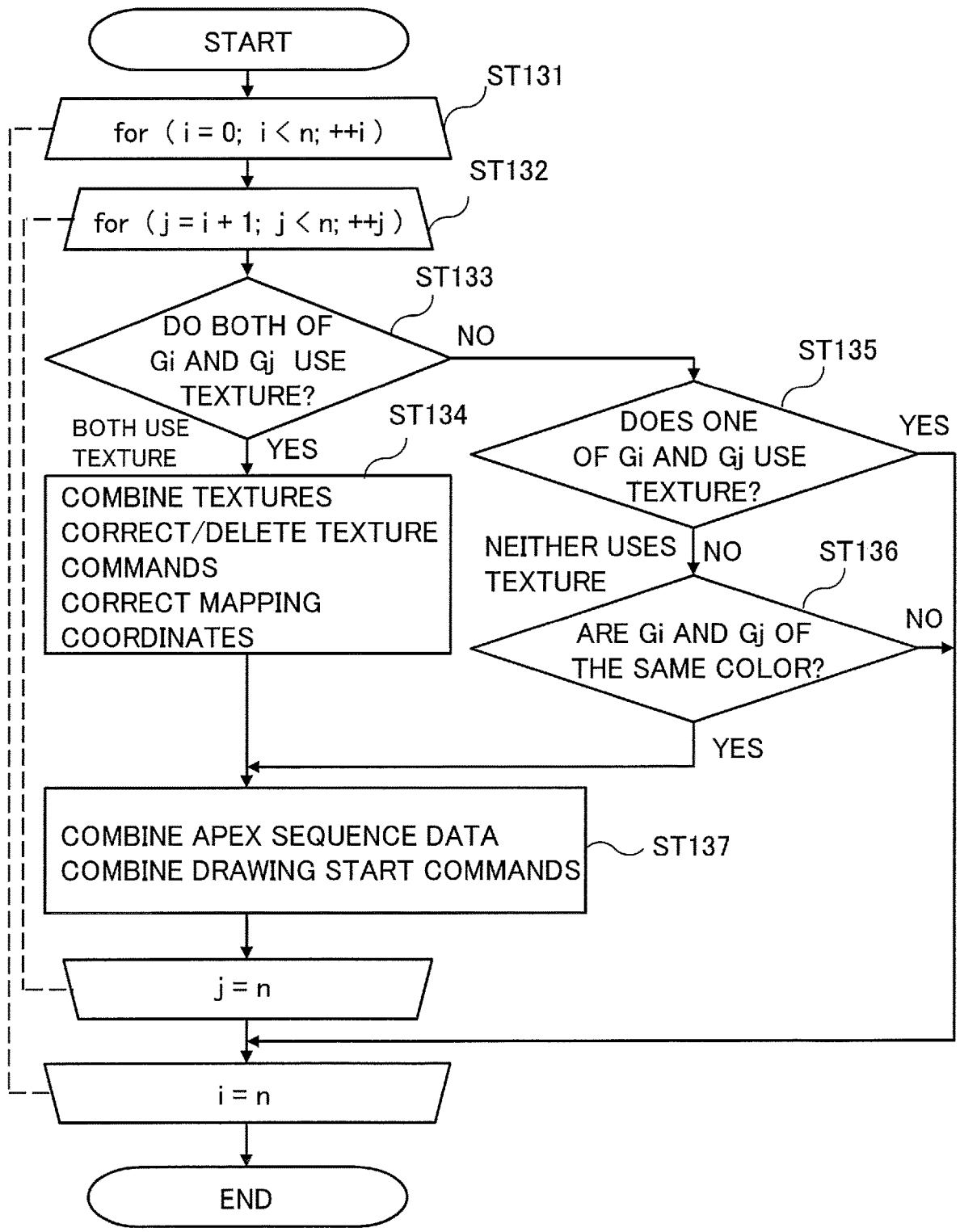
FIG. 9 is a flowchart showing an example of the operation of a drawing command combination unit of the image drawing device according to the embodiment.
Figure 10:
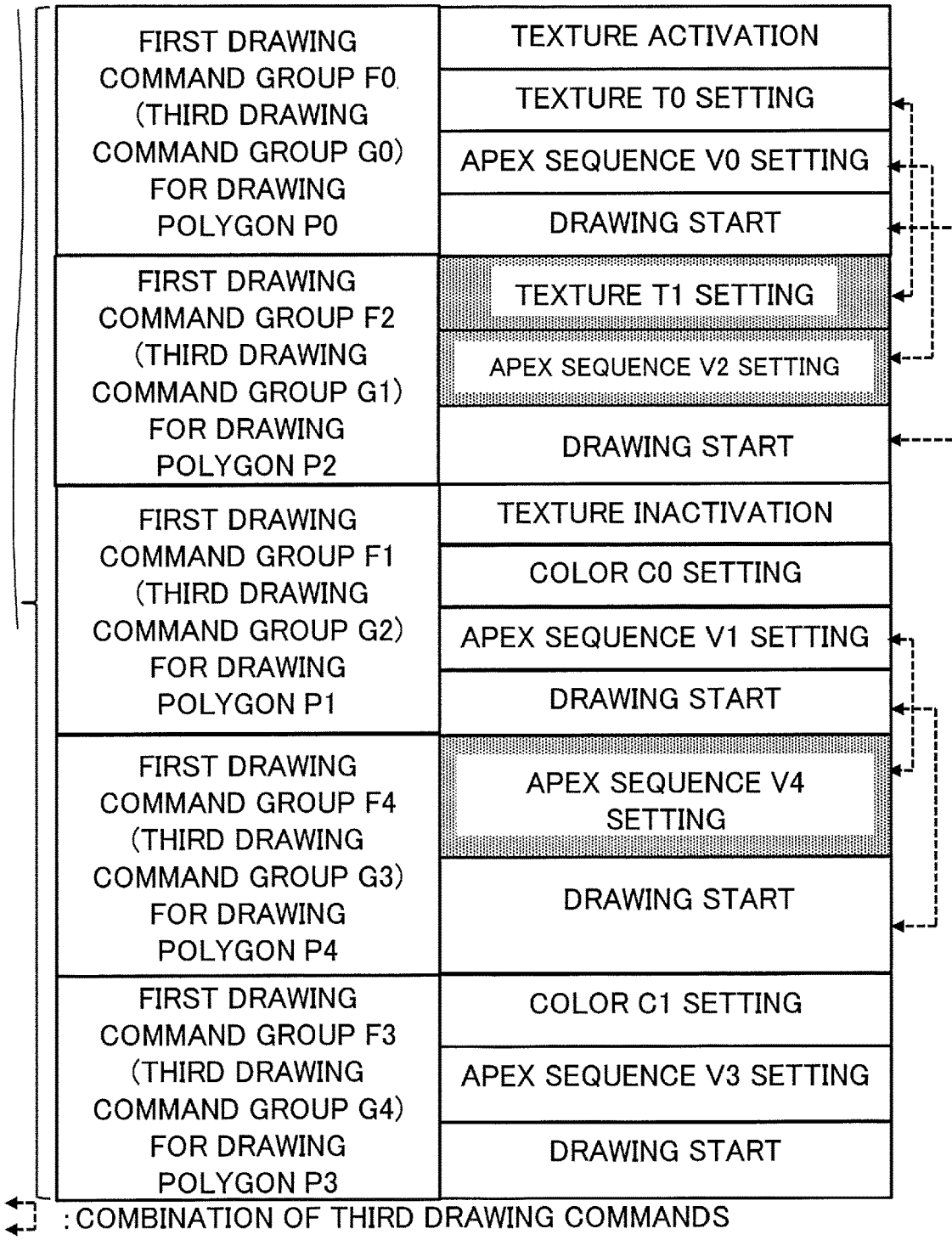
FIG. 10 is an explanatory drawing showing an example of the operation of the drawing command combination unit of the image drawing device according to the embodiment (combination of third drawing commands).

FIG. 9 is a flowchart showing an example of the operation of the drawing command combination unit 13. FIG. 10 is a diagram showing an example of the operation of the drawing command combination unit 13 (combination of third drawing commands). FIG. 11 is a diagram showing an example of the plurality of second drawing command groups G01, G23 and G4 supplied by the drawing command combination unit 13. FIG. 12 is a diagram showing an example of the plurality of pieces of second drawing data V0' (T0'), V1' and V3 supplied by the drawing command combination unit 13.

The drawing command combination unit 13 combines the plurality of pieces of first drawing data V0 (T0), V1, V2 (T1), V3 and V4 and combines the third drawing commands so as to reduce (or desirably minimize) the number of third drawing commands. This can be carried out by the following process, for example.

As shown in FIG. 9, the drawing command combination unit 13 initializes a variable i to 0 in step ST131, executes the processing from step ST132 (loop process of the step ST132), and increments the variable i. Then, the drawing command combination unit 13 repeats the same processing (loop process of the step ST132) as long as i<n, and ends the loop process of the step ST131 when i=n.

The drawing command combination unit 13 initializes a variable j to i+1 in the step ST132, executes the processing from step ST133 (processing of steps ST133 to ST137), and increments the variable j. Then, the drawing command combination unit 13 repeats the same processing (processing of the steps ST133 to ST137) as long as j<n, and ends the loop process of the step ST132 when j=n.

In the step ST133, the drawing command combination unit 13 refers to a third drawing command group Gi and a third drawing command group Gj corresponding to the variable i and the variable j and checks whether or not both of the third drawing command group Gi and the third drawing command group Gj use texture. When both of the third drawing command group Gi and the third drawing command group Gj use texture (YES in the step ST133), the drawing command combination unit 13 advances the process to step ST134. Otherwise (NO in the step ST133), the drawing command combination unit 13 advances the process to step ST135.

In the step ST134, the drawing command combination unit 13 combines two textures (two texture images) T0 and T1 used by the third drawing command group Gi and the third drawing command group Gj and thereby generates one texture (one texture image) T0' corresponding to the textures T0 and T1 as shown in FIG. 10 and FIG. 11. In this case, the drawing command combination unit 13 changes the texture setting command included in the third drawing command group Gi shown in FIG. 10 to indicate a combined texture image like the second drawing data V0' (T0'), V1' and V3 shown in FIG. 12, and deletes the texture setting command "texture T1 setting" included in the third drawing command group Gj shown in FIG. 10. Further, in addition to the combination of texture images, the texture coordinates included in the apex sequence data indicated by the apex sequence setting commands included in the third drawing command group Gi and the third drawing command group Gj are updated. For example, when a texture image T1 indicated by the texture setting command in the third drawing command group Gi and a texture image Tj indicated by the texture setting command in the third drawing command group Gj are arranged side by side and combined, the coordinates of each pixel of the texture image Tj in the combined image are shifted by the number of pixels corresponding to the width of the texture image T1, and thus the number of pixels corresponding to the width of the texture image T1 is added to the x coordinate (on the coordinate axis in the horizontal direction in FIG. 12) in the texture coordinates included in the apex sequence data indicated by the apex sequence setting command in the third drawing command group Gj. Thereafter, the drawing command combination unit 13 advances the process to the step ST137.

In the step ST135, the drawing command combination unit 13 checks whether or not only one of the third drawing command group Gi and the third drawing command group Gj uses texture. When neither the third drawing command group Gi nor the third drawing command group Gj uses texture (NO in the step ST135), the drawing command combination unit 13 advances the process to step ST136. When only one of the third drawing command group Gi and the third drawing command group Gj uses texture (YES in the step ST135), the drawing command combination unit 13 exits the loop process ST132 and returns the process to the step ST131.

In the step ST136, the drawing command combination unit 13 checks whether or not the third drawing command group Gj includes no color designation command, that is, whether or not the third drawing command group Gi and the third drawing command group Gj draw polygons by using the same color. When the polygons are drawn by using the same color (YES in the step ST136), the drawing command combination unit 13 advances the process to the step S137. When polygons of different colors are drawn (NO in the step ST136), the drawing command combination unit 13 exits the loop process ST132 and returns the process to the step ST131.

In the step ST137, the drawing command combination unit 13 combines third drawing commands (reduces the number of third drawing commands) as shown in FIG. 10, for example, by combining the apex sequence data indicated by the apex sequence setting commands included in the third drawing command group Gi and the third drawing command group Gj and updating the apex sequence setting command included in the third drawing command group Gi to indicate the apex sequence data after the combining. Further, the drawing command combination unit 13 deletes the apex sequence setting command included in the third drawing command group Gj (hatched apex sequence setting commands in FIG. 10). Furthermore, the drawing command combination unit 13 deletes the third drawing command group Gj currently including the drawing start command alone (the third drawing command groups G1 and G4 in FIG. 10), and returns the process to the step ST132.

By executing the process shown in FIG. 9, the third drawing command groups G0 to G4 in FIG. 8 and the first drawing data V0 (T0), V1, V2 (T1), V3 and V4 in FIG. 4 are converted into the second drawing command groups G01, G23 and G4 shown in FIG. 11 and the second drawing data V0' (T0'), V1' and V3 shown in FIG. 12.

(5) Drawing Command Execution Unit 14

The drawing command execution unit 14 successively executes the second drawing commands included in the second drawing command groups G01, G23 and G4 while transmitting the second drawing data V0' (T0'), V1' and V3 recorded in the first storage device 20 to the drawing unit 31.

(6) Drawing Unit 31

The drawing unit 31 carries out the drawing in the second storage device 40 according to the second drawing commands (FIG. 11) and the second drawing data V0' (T0'), V1' and V3 (FIG. 12) received from the drawing command execution unit 14. The drawing unit 31 draws the drawing image (graphics) in a frame buffer in the second storage device 40, for example. Then, after the completion of the drawing, the drawing result is outputted to the display device 50. This process is the same as the drawing process performed by standard GPUs.

(7) Display Device 50

The display device 50 displays an image according to the image data received from the drawing unit 31 (e.g., displays a graphic image corresponding to the drawing image drawn in the frame buffer) on the display screen 51. The display device 50 is not a component essential for the image drawing device 1 according to this embodiment and can be replaced with another image output means such as an image data transmission device, a printer or a projector.

(8) Effect

In the image drawing device 1 and the image drawing method according to this embodiment, the first processor 10 outputs the second drawing data V0' (T0'), V1' and V3 and the second drawing command groups G01, G23 and G4, capable of reducing the number of changes of the drawing condition of the second processor 30, to the second processor 30, by which the drawing efficiency can be increased, and consequently, the drawing speed in the image drawing device 1 can be increased.

By employing the image drawing program according to this embodiment for the first processor 10, the second drawing data V0' (T0'), V1' and V3 and the second drawing command groups G01, G23 and G4 capable of reducing the number of changes of the drawing condition of the second processor 30 can be outputted to the second processor 30, by which the drawing efficiency can be increased, and consequently, the drawing speed in the image drawing device 1 can be increased.

(9) Modifications

In the above description, two-dimensional polygons are used as the drawing data constituting the drawing content and the two-dimensional polygons are designated by apex sequence data and texture data or apex sequence data and color data. However, the polygons as the drawing data may carry other information (e.g., information indicating a normal line, light reflection information, or the like) that can be handled by the GPU as the second processor 30. Further, in a case where the GPU as the second processor 30 is an image drawing device that handles image data while setting the drawing condition according to the drawing condition alteration command outputted from the CPU as the first processor 10, any type of data besides polygons can be used as the drawing data constituting the drawing content.

While an example of a process executed by the drawing command reorder unit 12 (FIG. 6) was shown in the above description, any other algorithm (e.g., algorithm solving an optimization problem) may be used as long as the algorithm implements a process capable of reducing the drawing condition alteration commands. Further, the drawing command reorder unit 12 may carry out the reordering of the drawing command groups not giving high priority to the reduction of the drawing condition alteration commands in the drawing command reorder unit 12 but giving high priority to making the drawing command combination unit 13 combine as many drawing commands and as many pieces of drawing data.

While the drawing command combination unit 13 in the above description employs the algorithm of generating one texture image T0' by arranging two texture images side by side and combining them together as shown in FIG. 12, any other algorithm (e.g., algorithm solving a two-dimensional bin packing problem) may be used for the combining of texture images (generation of a texture atlas).

While a process for displaying an image of one frame, that is, a drawing process for one cycle, is described above, in a case where a drawing process for a plurality of frames is carried out, it is possible to reduce the amount of image processing by the drawing command combination unit 13 by storing the texture data and the apex sequence data generated by the combination process by the drawing command combination unit 13 and reusing the stored texture data and apex sequence data for the drawing process of the next and subsequent frames. Further, also in the drawing process in one frame, the recorded data after the combination may be reused when the same drawing data is used a plurality of times. In this case, the amount of information processing by the first processor 10 can be reduced.

While the drawing data are recorded in the first storage device 20 and the drawing command execution unit 14 transmits necessary drawing data to the drawing unit 31 in the above description, the drawing unit 31 may record part or all of the received data in the second storage device 40 and use the recorded data when the same data is used in a subsequent drawing process. In this case, the amount of information processing by the second processor 30 can be reduced.

While the drawing data are recorded in the first storage device 20 and the drawing command execution unit 14 transmits necessary second drawing data V0' (T0'), V1' and V3 to the drawing unit 31 in the above description, the second drawing data may be outputted from the first processor 10 to the second processor 30 with intended timing in order to increase the processing efficiency. For example, when the drawing command combination unit 13 judges that part of the drawing data should not be combined in the subsequent process, the drawing command combination unit 13 may start transmitting the part of the drawing data to the drawing unit 31 before the whole process in the drawing command combination unit 13 is completed. In this case, the drawing speed in the image drawing device 1 can be increased.

INDUSTRIAL APPLICABILITY

The image drawing device and the image drawing method according to this embodiment are applicable to various types of information processing devices (e.g., computer) including a CPU as the first processor 10 and a GPU as the second processor 30 receiving the drawing data and the drawing command groups from the CPU.

DESCRIPTION OF REFERENCE CHARACTERS

1: image drawing device, 10: first processor (CPU), 11: application execution unit, 12: drawing command reorder unit, 13: drawing command combination unit, 14: drawing command execution unit, 20: first storage device (main memory), 30: second processor (GPU), 31: drawing unit, 40: second storage device (VRAM), 50: display device, 51: display screen.

What is claimed:

1. An image drawing device comprising:
a first processor to generate a plurality of pieces of second drawing data and a plurality of second drawing command groups including a plurality of second drawing commands from a plurality of pieces of first drawing data and a plurality of first drawing command groups including a plurality of first drawing commands, each of the first drawing command groups corresponding to a different polygon to be rendered; and
a second processor to execute a drawing process based on the plurality of pieces of second drawing data and the plurality of second drawing command groups outputted from the first processor,
wherein the first processor includes:
a drawing command reorder unit to generate a plurality of third drawing command groups by changing an arrangement order indicating an order of executing the plurality of first drawing command groups and deleting first drawing commands for rendering an unobstructed polygon that have become unnecessary to execute in order to render the unobstructed polygon due to the changing of the arrangement order of the plurality of first drawing command groups among the plurality of first drawing commands;
a drawing command combination unit to generate the plurality of pieces of second drawing data by combining pieces of first drawing data corresponding to third drawing commands that can be executed by the second processor in a same drawing condition among a plurality of third drawing commands included in the plurality of third drawing command groups and generate the plurality of second drawing command groups corresponding to the plurality of pieces of second drawing data by deleting the third drawing commands for rendering the unobstructed polygon that have become unnecessary to execute in order to render the unobstructed polygon due to the combining of the pieces of first drawing data; and
a drawing command execution unit to execute each of the plurality of second drawing commands in an arrangement order of the plurality of second drawing commands.

2. The image drawing device according to claim 1, wherein the drawing command reorder unit changes the arrangement order of the plurality of first drawing command groups so that a number of the plurality of third drawing commands included in the plurality of third drawing command groups decreases.

3. The image drawing device according to claim 1, wherein
the second drawing data includes apex sequence data of each of the different polygons and texture data of each of the different polygons, and
the drawing command combination unit combines the texture data to each other so that a number of the plurality of pieces of second drawing data decreases.

4. The image drawing device according to claim 1, further comprising a first storage device,
wherein the drawing command combination unit stores the plurality of pieces of second drawing data and the plurality of second drawing command groups in the first storage device.

5. The image drawing device according to claim 1, further comprising a second storage device,
wherein the second processor stores a result of the drawing process based on the plurality of pieces of second drawing data and the plurality of second drawing command groups outputted from the first processor in the second storage device.

6. The image drawing device according to claim 1, wherein the drawing command execution unit starts outputting part of the plurality of pieces of second drawing data to the second processor before completion of the generation of the plurality of pieces of second drawing data by the drawing command combination unit.

7. The image drawing device according to claim 1, further comprising a display device that displays an image based on a result of the drawing process by the second processor.

8. An image drawing method in a device including a first processor that generates a plurality of pieces of second drawing data and a plurality of second drawing command groups including a plurality of second drawing commands from a plurality of pieces of first drawing data and a plurality of first drawing command groups including a plurality of first drawing commands, each of the first drawing command groups corresponding to a different polygon to be rendered, and a second processor that executes a drawing process based on the plurality of pieces of second drawing data and the plurality of second drawing command groups outputted from the first processor, the method comprising:
generating a plurality of third drawing command groups by changing an arrangement order indicating an order of executing the plurality of first drawing command groups and deleting first drawing commands for rendering an unobstructed polygon that have become unnecessary to execute in order to render the unobstructed polygon due to the changing of the arrangement order of the plurality of first drawing command groups among the plurality of first drawing commands;
generating the plurality of pieces of second drawing data by combining pieces of first drawing data corresponding to third drawing commands that can be executed by the second processor in a same drawing condition among a plurality of third drawing commands included in the plurality of third drawing command groups, and generating the plurality of second drawing command groups corresponding to the plurality of pieces of second drawing data by deleting the third drawing commands for rendering the unobstructed polygon that have become unnecessary to execute in order to render the unobstructed polygon due to the combining of the pieces of first drawing data; and
executing each of the plurality of second drawing commands in an arrangement order of the plurality of second drawing commands.

9. An image drawing device comprising:
first and second processors to execute a program; and
a memory to store the program which, when executed by the first and second processors, performs
a process of generating a plurality of pieces of second drawing data and a plurality of second drawing command groups including a plurality of second drawing commands from a plurality of pieces of first drawing data and a plurality of first drawing command groups including a plurality of first drawing commands, each of the first drawing command groups corresponding to a different polygon to be rendered; and a process of executing a drawing process based on the plurality of pieces of second drawing data and the plurality of second drawing command groups outputted from the first processor;

wherein the program, when executed by the first processor, performs a process of generating a plurality of third drawing command groups by changing an arrangement order indicating an order of executing the plurality of first drawing command groups and deleting first drawing commands for rendering an unobstructed polygon that have become unnecessary to execute in order to render the unobstructed polygon due to the changing of the arrangement order of the plurality of first drawing command groups among the plurality of first drawing commands;

a process of generating the plurality of pieces of second drawing data by combining pieces of first drawing data corresponding to third drawing commands that can be executed by the second processor in a same drawing condition among a plurality of third drawing commands included in the plurality of third drawing command groups and generating the plurality of second drawing command groups corresponding to the plurality of pieces of second drawing data by deleting the third drawing commands for rendering the unobstructed polygon that have become unnecessary to execute in order to render the unobstructed polygon due to the combining of the pieces of first drawing data; and a process of executing each of the plurality of second drawing commands in an arrangement order of the plurality of second drawing commands.

* * * * *